United States Patent
Hilbig et al.

(10) Patent No.: US 10,258,919 B2
(45) Date of Patent: Apr. 16, 2019

(54) OXYGEN SEPARATOR WITH IMPROVED EFFICIENCY

(71) Applicant: KONINKLIJKE PHILIPS N.V., Eindhoven (NL)

(72) Inventors: Rainer Hilbig, Aachen (DE); Achim Gerhard Rolf Koerber, Eindhoven (NL); Paul Van Der Sluis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/752,609

(22) PCT Filed: Aug. 8, 2016

(86) PCT No.: PCT/EP2016/068843
§ 371 (c)(1),
(2) Date: Feb. 14, 2018

(87) PCT Pub. No.: WO2017/029142
PCT Pub. Date: Feb. 23, 2017

(65) Prior Publication Data
US 2018/0236394 A1    Aug. 23, 2018

(30) Foreign Application Priority Data
Aug. 19, 2015    (EP) .................................... 15181511

(51) Int. Cl.
*B01D 53/02*    (2006.01)
*B01D 53/047*    (2006.01)
*B01D 53/04*    (2006.01)

(52) U.S. Cl.
CPC ....... *B01D 53/047* (2013.01); *B01D 53/0454* (2013.01); *B01D 2253/108* (2013.01);
(Continued)

(58) Field of Classification Search
CPC ........ B01D 2253/108; B01D 2253/116; B01D 2253/204; B01D 2256/12;
(Continued)

(56) References Cited

U.S. PATENT DOCUMENTS 4,162,146 A * 7/1979 Seibert .................. B01D 53/04
96/113
4,948,401 A * 8/1990 Izumi ................. B01D 53/0473
96/115
(Continued)

FOREIGN PATENT DOCUMENTS

AU    469601    1/1974
JP    S5265773 A    5/1977

*Primary Examiner* — Christopher P Jones
(74) *Attorney, Agent, or Firm* — Michael W. Haas

(57) ABSTRACT

An oxygen separator for generating an oxygen-enriched gas from an oxygen comprising gas, said oxygen separator comprising: a) an oxygen separator device comprising i) a sorbent material for sorbing at least one component of the oxygen comprising gas; and ii) at least two controllable interfaces, comprising a first controllable interface and a second controllable interface, for controlling the communication of gas between the inside and the outside of the oxygen separator device, b) a processor for controlling the oxygen separator such that a plurality of phases are sequentially carried, amongst them a purging phase; wherein the processor is configured to control the at least two controllable interfaces such that a flow of gas is generated between the first controllable interface and the second controllable interface during at least the purging phase, wherein the second controllable interface is located and/or controlled such that it controls the fluidic coupling between the inside of the oxygen separator device and a volume of non-oxygen-enriched gas during the purging phase.

14 Claims, 9 Drawing Sheets

(52) U.S. Cl.
CPC .. *B01D 2253/116* (2013.01); *B01D 2253/204* (2013.01); *B01D 2256/12* (2013.01); *B01D 2257/102* (2013.01); *B01D 2259/4002* (2013.01); *B01D 2259/402* (2013.01); *B01D 2259/40007* (2013.01); *B01D 2259/40013* (2013.01); *B01D 2259/40028* (2013.01); *B01D 2259/40035* (2013.01); *B01D 2259/40043* (2013.01); *B01D 2259/40056* (2013.01); *B01D 2259/40062* (2013.01); *B01D 2259/4533* (2013.01)

(58) Field of Classification Search
CPC .... B01D 2257/102; B01D 2259/40007; B01D 2259/40013; B01D 2259/4002; B01D 2259/40028; B01D 2259/40035; B01D 2259/40043; B01D 2259/40056; B01D 2259/40062; B01D 2259/402; B01D 2259/4533; B01D 53/0454; B01D 53/047
See application file for complete search history.

(56) References Cited

U.S. PATENT DOCUMENTS

| | | | | |
|---|---|---|---|---|
| 4,968,329 A | * | 11/1990 | Keefer | F02G 1/0435 |
| | | | | 95/98 |
| 6,146,447 A | * | 11/2000 | Sircar | B01D 53/053 |
| | | | | 95/101 |
| 6,176,897 B1 | * | 1/2001 | Keefer | B01D 53/0476 |
| | | | | 95/101 |
| 6,245,127 B1 | | 6/2001 | Kane | |
| 6,551,384 B1 | | 4/2003 | Ackley | |
| 7,402,193 B2 | | 7/2008 | Bliss | |
| 7,604,004 B2 | | 10/2009 | Jagger | |
| 2004/0050255 A1 | | 3/2004 | Simonds | |
| 2006/0288869 A1 | | 12/2006 | Warren | |
| 2012/0318145 A1 | | 12/2012 | Hilbig | |
| 2013/0233168 A1 | | 9/2013 | Richey, II | |
| 2014/0286827 A1 | * | 9/2014 | Kawada | B01D 53/22 |
| | | | | 422/108 |

* cited by examiner

OXYGEN SEPARATOR WITH IMPROVED EFFICIENCY

CROSS-REFERENCE TO RELATED APPLICATIONS

This patent application claims the priority benefit under 35 U.S.C. § 371 of international patent application no. PCT/EP2016/068843, filed Aug. 8, 2016, which claims the benefit of European Patent Application No. 15181511.5, filed on Aug. 19, 2015, the contents of which are herein incorporated by reference.

FIELD OF THE INVENTION

The invention relates to an oxygen separator for generating an oxygen-enriched gas from an oxygen comprising gas, said oxygen separator comprising: a) an oxygen separator device comprising, i) a sorbent material for sorbing at least one component of the oxygen comprising gas and ii) at least two controllable interfaces, comprising a first controllable interface and a second controllable interface, for controlling the communication of gas between the inside and the outside of the oxygen separator device, b) a processor for controlling the oxygen separator such that a plurality of phases are sequentially carried, amongst them a purging phase, wherein the processor is configured to control the at least two controllable interfaces such that a flow of gas is generated between the first controllable interface and the second controllable interface during at least the purging phase.

The invention further relates to a method for controlling an oxygen separator for separating an oxygen-enriched gas from an oxygen comprising gas, the method comprising the steps of: a) providing at least one oxygen separator device comprising, i) a sorbent material for sorbing at least one component of the oxygen comprising gas and ii) at least two controllable interfaces, comprising a first controllable interface and a second controllable interface, for controlling the communication of gas between the inside and the outside of the oxygen separator device, b) controlling the oxygen separator such that a plurality of phases are sequentially carried, amongst them a purging phase, c) controlling the at least two controllable interfaces such that a flow of gas is generated between the first controllable interface and the second controllable interface during at least the purging phase.

The invention further relates to a computer program code for causing an oxygen-enriched gas to be generated.

BACKGROUND OF THE INVENTION

Oxygen therapy is the administration of oxygen as a therapeutic intervention. Oxygen therapy may be used for a variety of interventions in both chronic and acute user care where an increased supply of oxygen to the lungs is needed, such that availability of oxygen to different body tissues is increased. Oxygen therapy may be used in different environment settings including hospital and/or home depending on a user's needs.

In order to provide a user with an oxygen-enriched gas, numerous means of generation and administration have been suggested. A known way to provide a user with an oxygen-enriched gas is via a so-called oxygen separator (or oxygen concentrator). Oxygen separators are commercially available and offered in different sizes and efficiencies as to fulfil distinctive user's needs (e.g.: the Philips SimplyGo). Those oxygen separators are capable of separating oxygen from ambient air (an oxygen comprising gas) and venting a nitrogen-enriched gas into the surrounding of said oxygen concentrator, thereby providing a user with an oxygen-enriched gas. Those known oxygen separators may provide for an "on-demand" or a continuous flow of oxygen-enriched gas.

Most of known oxygen separators (also named oxygen concentrators) separate ambient air (an oxygen comprising gas comprising a mixture of approximately 78% of nitrogen, approximately 21% of oxygen, approximately 0.9% of argon and other gases, such as argon, carbon dioxide, hydrogen, neon, helium) into an oxygen-enriched gas and an oxygen-depleted gas in a cyclic mode of operation. In a producing step of the oxygen-enriched generation cycle, ambient air is pressurized into a separating means, such that nitrogen is retained (for instance adsorbed) in said separating means and oxygen is collected as outflowing "product". In a purging phase of the oxygen-enriched generation cycle, the separating means is regenerated such that the previously retained nitrogen is released from the separating means and expelled from the oxygen separator into the surrounding atmosphere. To achieve the foregoing, usually two or more separating means comprising suitable selectively adsorbing or absorbing materials (such as a sorbent material). In this configuration, while one separating means is in a step producing oxygen at higher pressure, the other separating means sees its sorbent regenerated with part of the oxygen outflow produced by the first device flowing at a lower pressure. After a certain time some valves are switched and both separating means change their role.

A portable oxygen concentrator is known from U.S. Pat. No. 7,402,193. This document discloses a pair of sieve beds having first and second ends, a gas compressor for delivering air to the first ends of the sieve beds, a reservoir communicating with the second ends of the sieve beds, and an air manifold attached to the first ends of the sieve beds. The air manifold includes passages therein communicating with the gas compressor and the first ends of the sieve beds. A set of valves is coupled to the air manifold, and a controller is coupled to the valves for selectively orifice and closing the valves to alternately charge and purge the sieve beds to deliver concentrated oxygen into the reservoir. An oxygen delivery manifold communicates with the second ends of the sieve beds for delivering oxygen from the reservoir to a user. Pressure sensors may be provided in the reservoir and/or delivery line for controlling operation of the controller.

It is a drawback of known oxygen separators, especially portable oxygen separators, that they require a significant amount of energy to purge (or clean) the separating means from the sorbed component(s) during the purging phase of the oxygen-enriched generation cycle. The foregoing drawback leads to bigger power sources means (such as a battery) which are bulky, heavy, and volume demanding thereby limiting the portability of oxygen separators.

US 2004/0050255 discloses an oxygen concentrator which uses two cylinders cyclically in an oxygen generation mode and a back-flush mode. AU 469 601 discloses a gas separation system, for example for separating oxygen and nitrogen. It includes a nitrogen pre-purging and nitrogen purging stage.

SUMMARY OF THE INVENTION

It is an object of the invention to provide an oxygen separator of the kind set forth in the opening paragraphs which is configured to improve its power requirements by enabling an energy efficient purging phase; in other words, by enabling a purging phase of improved energy efficiency.

The invention is defined by the independent claims.

According to a first aspect of the invention, this object is realized by an oxygen separator as defined in the opening paragraph, characterized in that the second controllable interface is located and/or controlled such that it controls the fluidic coupling between the inside of the oxygen separator device and a volume of non-oxygen-enriched gas during the purging phase.

The invention is advantageous in that it enables a flow of gas, which does not comprise compressed oxygen-enriched gas, during the purging phase. Said purging phase of the oxygen-enriched generation cycle, characterized by a diminution of internal pressure within the oxygen separator device and the entry of a flow of gas at low pressure within the same, allows the sorbed component(s) of the oxygen comprising gas, for instance nitrogen, to be desorbed so as to be expulsed from the oxygen separator. The sorbed component(s) are therefore released from the sorbent material such that said sorbent material is regenerated, making it suitable for another production phase of the oxygen-enriched cycle wherein one or more components of the oxygen comprising gas will be sorbed, therefore enabling generation of an oxygen-enriched gas. Following desorption of the component(s) from the sorbent material, the internal concentration of said component(s) within the volume of gas within the oxygen separator device increases before said volume is expulsed from the oxygen separator device by a controllable interface as a volume of non-oxygen-enriched gas (or purging gas, or cleaning gas) enters the same oxygen separator device via another controllable interface. As said flow of non-oxygen-enriched gas is flowing into the oxygen separator device, the invention allows an increased yield of oxygen-enriched gas (product) from a same power output. Consequently, an increase of efficacy, or a decrease of energy consumption in comparison with similar devices as found in the state of the art is realized by the present invention. For the same yield of product, the oxygen separator according to the present invention requires less energy, as it will be further elucidated hereunder.

Another advantage of the present invention is that the flow of non-oxygen enriched gas may be uncompressed, therefore independent of the gas compressor. As a result of the foregoing, as it will be further elucidated hereunder, the gas compressor may be in an off-mode, or in an idle mode during the purging phase of the oxygen generation cycle, thereby diminishing the energy requirement of the oxygen separator during said phase. For the same yield of product, the oxygen separator according to the present invention requires less energy, being more energy efficient.

In another embodiment, the oxygen separator device further comprises a third controllable interface located and/or controlled such that it controls the fluidic coupling between the inside of the oxygen separator device and a volume of oxygen-enriched gas during at least the purging phase, wherein the processor is further configured such that a further flow of gas between the third controllable interface and the first controllable interface or the second controllable interface is generated during the purging phase. Said embodiment is advantageous in that said further flow of gas directs the flow of gas towards the controllable interface configured to output the volume of gas from the interior of the oxygen separator device towards the exterior of said oxygen separator device. This flow of oxygen-enriched gas is mixed with the flow of non-oxygen-enriched gas, thereby limiting the use of the oxygen-enriched gas (product) to the minimum needed, such that an increased quantity of oxygen-enriched gas is available to the user. This addition of further flow of gas (oxygen-enriched gas) to the flow of gas (non-oxygen-enriched gas) is advantageous as comprising a high concentration of oxygen, allowing the sorbing material located in the vicinity of the third controllable interface to remain uncontaminated from component(s) of the oxygen comprising gas. By keeping said sorbing material clean, the invention allows that any such component(s) will not enter the oxygen-enriched gas flow (or product flow) to be provided to the user during therapy, thereby enabling a good purity of the oxygen-enriched gas to be delivered to the user, alleviating, for instance, the need for a further filter means before delivery to said user.

In another embodiment, the second controllable interface is fluidically coupled to a reservoir for hosting the volume of non-oxygen-enriched gas. Said embodiment is advantageous in that the purging phase may rely on a constant volume and/or pressure of non-oxygen-enriched gas flowing into the oxygen separator device. The foregoing may insure a constant outcome of the purging phase, hence a constant sorbing desorption rate or sorbing percentage from the sorbing material after each and every cycle of the oxygen-generation cycle wherein generation of the oxygen-enriched gas from the oxygen comprising gas is achieved. Additionally or alternatively, said embodiment may be advantageous in that the reservoir may be coupled to a pressurized means (for instance the same gas compressor as found in a standard oxygen separator), such that the volume of non-oxygen-enriched gas comprised therein is at a higher pressure than the volume inside the oxygen separator device at the beginning of the purging phase, thereby allowing a constant flow of non-oxygen-enriched gas into the oxygen separator device via the second controllable interface without the need for further flow generator means.

In another embodiment, one of the first controllable interface or the second controllable interface is coupled to a fan (or a ventilator, or an air blower, or an aerator) for generating the flow of non-oxygen-enriched gas. Said embodiment is advantageous in that it alleviates the needs to have a gas compressor for enabling the flow of non-product-oxygen gas into the oxygen separator device; thereby improving energy efficiency of the oxygen separator as a fan (or a ventilator, or an air blower, or an aerator) requires a significant less amount of energy than a gas compressor. Consequently, in said embodiment, the gas compressor of the oxygen separator may be shut-off, or alternatively may run at less power (i.e. in an idle mode) during at least one phase of the oxygen-enriched generation cycle, preferably during the purging phase, thereby increasing the energy efficiency of the oxygen separator. Such increase of energy efficiency may be translated in a smaller battery pack for portable oxygen separator, additionally or alternatively, by a longer life span of the battery pack, additionally or alternatively by a weight reduction of the battery back.

In another embodiment, one of the first controllable interface or the second controllable interface is coupled to a vacuum pump (including but not limited to a positive displacement pump, a momentum transfer pump, a regenerative pump, or an entrapment pump) for generating the flow of non-oxygen-enriched gas. Said embodiment is advantageous for analogous reasons as set forth in the preceding embodiment, namely that it provides for an increase of energy efficiently as such vacuum pump, likewise the fan (or ventilator, or air blower, or aerator) consumes a lower (or lesser) amount of energy than a gas compressor for enabling the displacement of a volume of gas.

In another embodiment, the sorbent material comprises i) a feeding end for receiving the flow of oxygen comprising gas ii) a product end for outputting the flow of oxygen-enriched gas wherein the second controllable interface is located between the first controllable interface and the third controllable interface, at approximatively eighty percent (80%) or less of the distance separating the feeding end and the product end. Said embodiment is advantageous in that the flow of non-oxygen-enriched gas is guided into the oxygen separator device such to contact the sorbent material within the part (or the portion, or the region) of said sorbent material which has a nitrogen concentration at, or above ambient air (i.e.: about 78% at temperature pressure standard) due to sorbing from the sorbent material. This embodiment consequently ensures a proper purging of the sorbent material of the oxygen separator device during the purging phase, while limiting (or alleviating) contamination of a further part (or the further portion, or the further region) of said sorbent material with would have a concentration of nitrogen (N2) below ambient air, hence a concentration of oxygen (O2) above ambient air. The structural relation between the first, the second and the third controllable interfaces in this embodiment provides an optimization of the energy efficiency and/or yield of oxygen-enriched comprising gas for a given energy consumption of the oxygen separator.

In another embodiment, the oxygen separator device further comprises i) a feeding side for receiving the flow of oxygen comprising gas, ii) a product side for outputting the flow of oxygen-enriched gas, wherein the first controllable interface is located such that it controls the flow of oxygen comprising gas and the third controllable interface is located such that it controls the flow of oxygen-enriched gas. Said embodiment is advantageous in that it permits colocation of the second controllable interface and third controllable interface, thereby allowing the present invention to be used with standard oxygen separator devices; the latter generally comprising two controllable interfaces (one for receiving a compressed flow of oxygen comprising gas, and one for outputting a flow of oxygen-enriched gas). Consequently, this embodiment enables adaptation of standard oxygen separator devices such the oxygen separator can benefit from the advantages of the present invention, as herein elucidated.

In another embodiment, the sorbent material is at least one taken from the list of: i) Li-LSX zeolite, ii) Na—X zeolite, iii) Carbon Molecular Sieve (CMS), and iv) Metal-Organic Frameworks (MOFs). Said embodiment is advantageous in that the foregoing materials provide for suitable sorbent capability for an oxygen separator according to the present invention. Such materials usually adsorb and/or absorb component(s) present in the oxygen comprising gas, such as nitrogen, so that the oxygen-enriched gas is generated.

In another embodiment, the non-oxygen-enriched gas is ambient air. Said embodiment is advantageous in that it enables for a cost efficient oxygen separator while allowing the advantages mentioned above for the other embodiments are optimized. As ambient air is generally in the surrounding of an oxygen separator when in use by a user (e.g.: by a patient), alleviating the use of a further source of gas for the purging phase of the oxygen-enriched generation cycle is advantageous as allowing a diminished energy requirement of the oxygen separator.

In another embodiment wherein the processor is configured to control the first controllable interface, the second controllable interface and the third controllable interface such that: the flow of gas from is directed the second controllable interface towards the first controllable interface; and the further flow of gas is directed from the third controllable interface towards the first controllable interface; wherein the first controllable interface is configured to output gas out of the oxygen separator device. Said embodiment is advantageous as it enables purging of the sorbent material during the purging phase such that the advantages describes herein are met. The flow of non-oxygen-enriched gas flowing into the oxygen separator device and the flow of oxygen-enriched gas flowing into the same are mixed. By such flow of gas, the one or more components sorbed by the sorbent material are desorbed and guided to be exhausted from the oxygen separator. As mentioned earlier, this gas mixture into the oxygen separator allows for a flow of gas towards the output of the oxygen separator device, while enabling a suitable regeneration of the sorbent material within an energy efficient purging phase.

In another embodiment, the processor is configured to control the first controllable interface, the second controllable interface and the third controllable interface such that: the flow of gas is directed from the first controllable interface towards the second controllable interface; and the further flow of gas is directed from the third controllable interface towards the second controllable interface; wherein the second controllable interface is configured to output gas out of the oxygen separator device. Said embodiment is an alternative to the one depicted in the paragraph above, which provides for similar advantages.

In another embodiment, each of the first controllable interface, the second controllable interface and the third controllable interface respectively comprise a first valve, a second valve and a third valve, wherein the processor is configured to regulate the valves during the purging phase so that the flow of gas and/or the further flow of gas is generated. Said embodiment is advantageous in that it enables appropriate (or adequate, or suitable) control of any flow of gas that is entering and/or leaving the oxygen separator device following the processor opening and/or closing one or more valves such as to enable and/or disable a flow of gas between two or more elements of the oxygen separator, without contamination by gas that could have remained in the duct (conduit). Said embodiment is advantageous in that the valve system of the oxygen separator may be fully automated at the location of such controllable interfaces such as to enable a transfer of volume of gas such that one or more of the advantages hereinabove mentioned are realized.

According to a second aspect of the invention, the object of the invention is realized by a method for controlling an oxygen separator for separating an oxygen-enriched gas from an oxygen comprising gas characterized in the step of locating and/or controlling the second controllable interface such that it controls the fluidic coupling between the inside of the oxygen separator device and a volume of non-oxygen-enriched gas during the purging phase.

Said embodiment is advantageous for analogous reasons as the corresponding embodiments of the oxygen separator according to the present invention.

According to a third aspect of the invention, the object of the invention is realized by a computer program code for causing an oxygen-enriched gas to be generated, said computer program code configured, when run on a suitable computer or network, to cause the oxygen separator according to the first aspect of the present invention to carry out the steps of the oxygen concentration method according to the second aspect of the present invention.

Said embodiment is advantageous in that it enables, for instance, computerization of the method of the present invention, thereby providing analogous advantages to the corresponding embodiments of the oxygen separator according to the present invention.

Within the meaning of the present invention, a valve is a flow controller configured to enable, control, modify, affect, disable a flow of gas between two volumes, for instance the outside of the oxygen separator device and the inside of the oxygen separator device. Such valve could be or other pressure regulating devices suitable for use as valve could be, for example, a plug valve, a ball valve, a check valve, a butterfly valve, a solenoid, a pressure switch, and/or other pressure regulating devices Within the meaning of the present invention, an controllable interface may be an opening, an orifice, a gas intake, a gas outtake, a gas input, a gas output, or any other means capable of enabling a flow of gas between two different volumes, such as the inside volume of the oxygen separator device and the outside volume of said oxygen separator device. Such controllable interface may be directly controlled, for instance via a valve, or indirectly controlled, for instance via a flow of gas reaching or not reaching the controllable interface. The skilled in the art will understand that said controlling means (e.g. a valve) may be connected to a controllable interface, additionally or alternatively may be coupled to said controllable interface, additionally or alternatively may be coupleable to said controllable interface, additionally or alternatively may be in connection therewith via one or more conduits. The skilled in the art will further understand that when the oxygen separator comprises more than one controllable interfaces, any combination of the foregoing may be possible, such that a flow of gas is controlled between at least two volumes.

These and other aspects of the invention are apparent from and will be elucidated with reference to the embodiments described hereinafter.

It will be appreciated by those skilled in the art that two or more of the abovementioned options, implementations, and/or aspects of the invention may be combined in any way deemed useful.

BRIEF DESCRIPTION OF THE DRAWINGS

These and other aspects of the applicator device, the system and the method according to the invention will be further elucidated and described with reference to the drawing, in which.

DETAILED DESCRIPTION OF EMBODIMENTS

Figure 1:
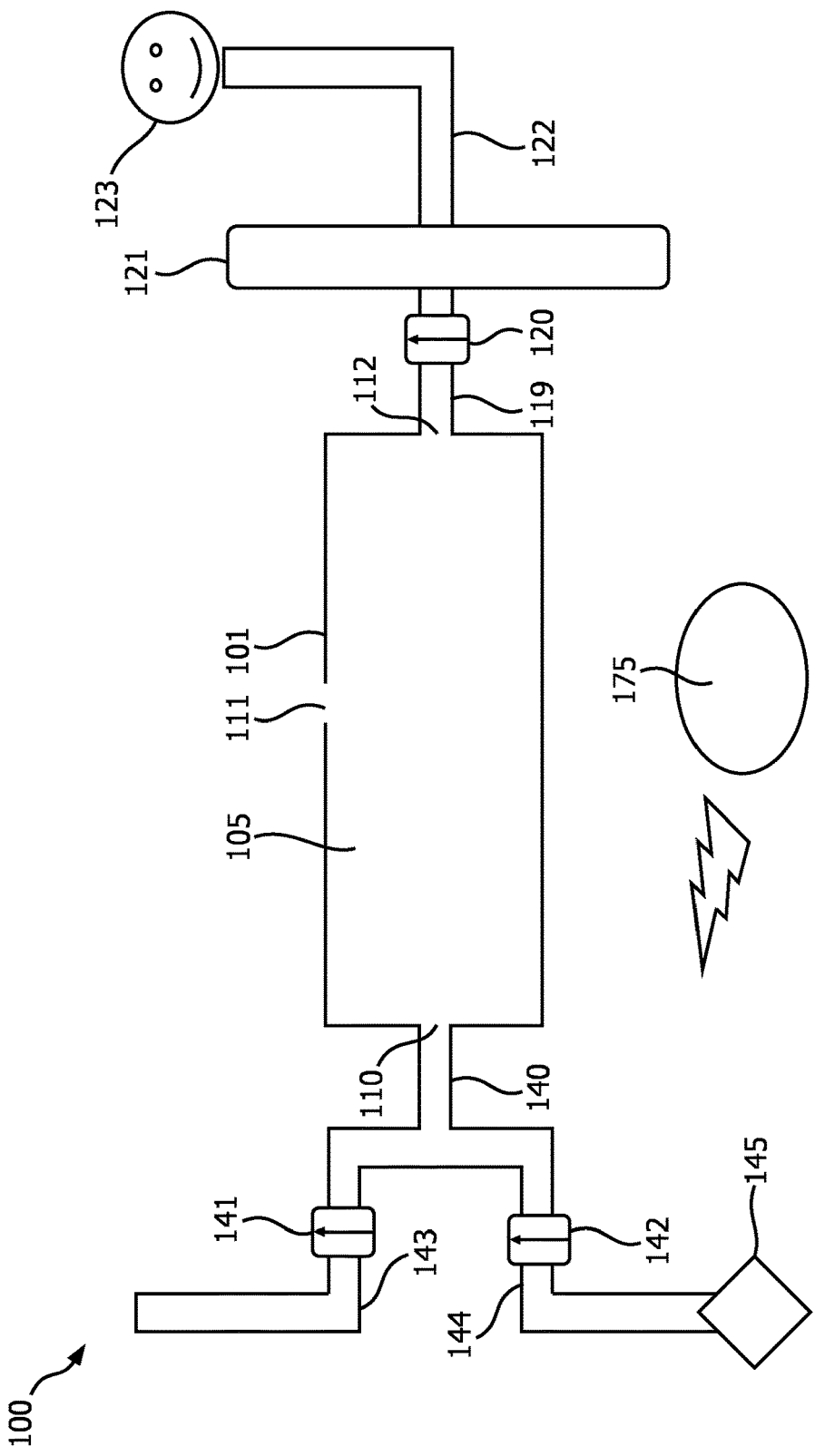
FIG. 1 is a schematic representation of an embodiment of an oxygen separator according to the present invention.

Certain embodiments will now be described in greater detail with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well known functions or constructions are not described in detail since they would obscure the embodiments with unnecessary detail. Moreover, expressions such as "at least one of", when preceding a list of elements, modify the entire list of elements and do not modify the individual elements of the list.

Embodiments of the present invention describe namely the generation of an oxygen-enriched gas from an oxygen comprising gas via a so-called pressure swing adsorption process (PSA), as it will be further detailed below. Alternative embodiments of the invention could generate the oxygen-enriched gas from alternative processes, such as a vacuum swing adsorption (VSA) process or mixed swing adsorption processes (PVSA).

The PSA process relies on the physical properties of gases to be attracted to solid surfaces (in other words, they are adsorbed) under high pressure. It is known that higher the pressure is, the more gas is adsorbed by such solid surface (such as a sorbent material). When the pressure is reduced, the gas is released, or desorbed from said solid surface. Separation of different gases is achieved under PSA processes as different gases are attracted with a different force to a given surface. The level of attraction of a specific gas is directly proportional to a coefficient of adsorption of the chosen solid for this specific gas. In other words, different gas are not attracted (or adsorbed) at the same force by the same solid. As an example, material molecular sieve may bound strongly nitrogen (N2) when contacting said material molecular sieve at a given pressure, while minimally bounding oxygen (O2) under the same pressure.

From the foregoing example, it will be understood that at least one component (for instance nitrogen) of a gas comprising oxygen (for instance ambient air) flowing at a given pressure in a receptacle comprising a sorbent material that attracts at least one component of ambient air stronger than another component (for example a sieve bed, for instance a molecular sieve bed, for instance an oxygen separator device) and an inlet and an outlet, said at least one component will be partially sorbed by the molecular sieve material (for instance zeolite, for instance Li—SX zeolite, Na—X zeolite as it will be elucidated below), such that said at least one component will remain in the receptacle while a flow of gas deprived of said component will be outflowed via the outlet.

When a gas mixture comprising oxygen (O2) and nitrogen (N2), such as ambient air, is passed under pressure through a vessel (a sieve bed, an oxygen separator device) containing a chosen sorbent material configured to attract nitrogen more strongly than it attracts oxygen, part of the nitrogen will be adsorbed by the sieve material, while the oxygen remains "free" in the oxygen separator device. The skilled person will see that the foregoing described process cannot be pursued indefinitely on a given oxygen separator device as at some moment, said given oxygen separator device reaches its maximal adsorption capacity. Once this threshold is reached (i.e. maximal adsorption capacity), the sorbent material is not capable of sorbing component(s), and is characterized by nitrogen (the gas component to be sorbed) making its way through the oxygen separator device and outflowed via the outlet. Such outcome is also known as "breakthrough". In the foregoing situation, the sorbing material needs to be changed, or alternatively to be "purged". Purging an sorbing material can be made by inflowing a gas at lower pressure, such that the chemical bound between the adsorbed gas component and the adsorbent material is loosen, therefore desorbing, or releasing the sorbed gas. Pressure swing adsorption is generally characterized by cyclic feeding (or producing) and purging of the oxygen separator device such that a same oxygen separator device comprising a sorbent material can be used more than once.

Typically, a known oxygen separator comprises two oxygen separator devices which make use of a cyclic 4 steps PSA process so as to generate oxygen-enriched gas from an oxygen comprising gas, such as ambient air. As an example of these four steps on known oxygen separator, the skilled in the art could see the following ones carried alternately on each of the oxygen separator device:

1—pressurizing and production, wherein compressed ambient air is fed into a first oxygen separator device and where oxygen-enriched gas is outputted from said oxygen separator device, and where part of said produced oxygen-enriched gas is stored into a reservoir. A part (or a portion) of the oxygen-enriched gas is guided towards a second oxygen separator devices, said part (or portion) defined by the size of the orifice (e.g. a passive flow-controller) in the guiding means (for instance conduit, a duct, a pipe, a tube) between the first and the second oxygen separator device.

2—pressure balancing towards a lower pressure, wherein pressure of the first oxygen separator device (that undergone the pressurizing and producing phase) drops, and equalization of the internal pressure of the first and the second oxygen separator device by the guiding means fluidically coupling the respective product ends of each of the oxygen separator devices (i.e. the side of the oxygen separator device by which the oxygen-enriched gas is outflowed for delivery to the user);

3—exhaust and oxygen purge, wherein exhalation of adsorbed (or absorbed) nitrogen within sorbent material is supported by a cleaning flow (purging flow) made of solely oxygen-enriched gas from the reservoir. The pressure in this oxygen separator device equals about atmospheric pressure at the end of the phase (for example, 1 ATM).

4—pressure balancing towards higher pressure, wherein pressure of the second oxygen separator device increases such as to prepare for a production phase and where the first oxygen separator device undergoes so called down-balancing (as described in step 2 above).

In summary, an oxygen-enriched gas is produced from an oxygen comprising gas by cyclically enable two or more oxygen separator devices to alternately carry a purging, a producing (or feeding), an equalizing and a discharging phase (or step). This "feeding" phase may be described as the step where, at a given moment, a pressurized oxygen-enriched gas is generated by one oxygen separator device, stored and delivered to a user. This generated oxygen-enriched gas may also be used to ventilate, at a low pressure (in essence lower than the pressure generated by the gas compressor for generating the flow of compressed ambient air, preferably lower than the sorbing pressure of nitrogen with the chosen sorbent material), the other oxygen separator device; the latter operation is also known as the "purging" step. A number of flow controllers that are controlled by a control device usually controls the "feeding" and "purging" steps. The skilled in the art will see that although the exemplary embodiment describing the different phases of the PSA cycle on an oxygen separator device has been made relative to two oxygen separator devices fluidically connected to each other, the same process may be carried on one oxygen separator device, where the abovementioned four phases will be cyclically carried on the same oxygen separator device.

In an exemplary system, in a producing step of the cycle, the oxygen comprising gas is fed as "inflow" into an oxygen separator device at a high pressure feed ("feeding" step), nitrogen is kept such as adsorbed within this device and oxygen-enriched gas is collected as outflowing "product" in a product tank or receptacle (product side). In a regeneration step of the cycle the separation device is regenerated, i.e. a purge gas such as a part of the produced oxygen enriched gas, for example, is fed back into the device at a low-pressure purge and the previously adsorbed nitrogen is released as exhaust into the surrounding atmosphere ("purging" step). When two separation devices filled with suitable selectively sorbent material are used: while one device is in the "feed" step producing oxygen-enriched gas at higher pressure, the other device, is in the "purge" step at lower pressure. After a certain time respectively arranged valves are switched and both oxygen separator devices change their role.

In the interval of the change of step of an oxygen separator device (i.e.: from a "feed" step to a "purge" step or from a "purge" step to a "feed" step), an "equalization" step may occur as to equilibrate (or balance) the internal pressure of the two oxygen separator devices. A way of achieving such equalization step is by the absence of pressurized flow of oxygen comprising gas guided to any of the inlet of the oxygen separator devices, while those oxygen separator devices are in a fluidic connection. In an alternative way, a flow of oxygen comprising gas is guided at a low pressure to any of the inlet of the oxygen separator devices, while those oxygen separator devices are in a fluidic connection. Pressure equilibrium is made possible by a conduit (for instance an equalization duct) coupled to the respective outlets of the two oxygen separator devices. In detail, the efficiency of a PSA cycle, for example, is increasing if part of the compressed-air energy stored in the first device after the feed step is re-used for pressurizing the second device to an intermediate pressure. To this purpose, a short "equalization" step during which both devices are connected at their product side (respective outlet) by said equalization duct is inserted between (some of) the main steps of the operating cycle.

Although based on the same physical properties than known oxygen separators (or oxygen concentrators), the oxygen separator according to the present invention proposes number of advantages as highlighted above which will be elucidated below with reference to the drawings.

FIG. 1 is a schematic representation of a first embodiment of an oxygen separator according to the present invention. The oxygen separator 100 comprises a gas compressor 145 configured to pressurize an oxygen-comprising gas, for instance ambient air, such that a flow of compressed oxygen-comprising gas is provided to an oxygen separator device 101 (for instance a sieve bed, or a molecular sieve bed). One or more conduits 144 (or pipes, or ducts, or channels, or tubes) are configured to provide a fluidic communication between the gas compressor 145 and the oxygen separator device 101. Said one or more conduits 144 may comprise one or more filters (not shown) and/or one or more sensors (not shown) for measuring, amongst other, the flow velocity of the oxygen-comprising gas in said one or more conduits 144. A valve 142 (feed valve) is coupled to said conduit 144, located between the gas compressor 145 and the oxygen separator device 101, such as to control the flow of compressed oxygen comprising gas guided towards the oxygen separator device 101 via a further conduit 140. Said valve 142 may totally block the flow of compressed oxygen comprising gas, may completely allow said flow of compressed oxygen comprising gas, or may partially allow, or partially block said flow of compressed oxygen comprising gas.

Depending of the oxygen generation phase (amongst, for example, the four phases previously described, for example a PSA phase) the valve 142 will be in a predefined position (open, or closed, or partially open, or partially closed) and the gas compressor 145 will be at a predefined intensity status, for example on compressing a flow of oxygen comprising gas, or off, or at low intensity (e.g. in an idle mode). For example, when oxygen separator device 101 is in a production phase (configured to generate an oxygen-enriched gas), the gas compressor 145 is an on mode, thereby compressing the flow of oxygen comprising gas. The compressed oxygen comprising gas will then flow within the conduit 144 until it reaches the valve 142, which, in this producing phase, will be in an open position, allowing said flow of compressed oxygen comprising gas to reach the oxygen separator device 101 via the further conduit 140. Alternatively, when the oxygen separator device 101 is in a purging phase (or cleaning phase), the gas compressor is in an off mode, or in an idle mode (or alternatively in a mode where it doesn't compress oxygen comprising gas, or alternatively slightly compress oxygen comprising gas) such that low pressure oxygen comprising gas is guided via the conduit 144 to the valve 142 which is in a close position, thereby blocking (totally or partially) access of the oxygen comprising gas to the oxygen separator device 101.

The further conduit 144 is configured to guide the flow of compressed oxygen comprising gas towards the oxygen separator device 101 (so called feed side), but also configured, in another oxygen generation phase, such as the exhausting and/or purging phase, to guide a flow of low pressure gas out of the oxygen separator device 101 such that it is expelled (or exhausted) from the oxygen separator 100 guided by an exhaust conduit 143. A valve (exhaust valve) 141 is coupled to the exhaust conduit 143 such as to regulate the flow of gas expelled from the oxygen separator 100. Moreover, once feeding valve 142 is in an open position, thus allowing the compressed flow of oxygen comprising gas to the oxygen separator device 101, exhaust valve 141 is in a closed position such that the totality, or a high proportion of the compressed oxygen comprising gas reaches the oxygen separator device 101. The contrasting status of valves 141 and 142 during the feeding and the purging phase shall, as described above, be done when valves 141 and 142 are in fluidic communication with each other via the duct 140, as shown in FIG. 1 such as to reach the effects hereby described.

Additionally or alternatively, other configurations of the conduits and/or of the valves can be foreseen by the skilled in the art. In an exemplary embodiment, a rotating valve for instance would be situated in conduit 140 such that a flow of gas is in fluidic communication either between conduit 144 and conduit 140, or conduit 143 and conduit 140 depending of the phase in which the oxygen separator device 101 is.

The oxygen separator device 101 is in fluidic communication with the conduit 140 on its feed side, and in fluidic communication with conduit 119 on its product side. The conduit 119 (product conduit, or equalization conduit) is configured to guide a flow of oxygen-enriched comprising gas from the oxygen separator device 101 towards a reservoir 121 (or product accumulator). Additionally, said conduit 119 could be, when the oxygen concentrator 100 comprises more than one oxygen separator devices, in fluidic communication with the other(s) oxygen separator devices such as to guide a flow of oxygen-enriched gas between the respective two product ends of each oxygen separator device. Such fluidic communication has mainly, but not exclusively, the effect of balancing (or equalizing) the internal pressure of the more than one oxygen separator devices during at least one sub-phase of the oxygen generation cycle.

Although the reservoir 121 is not essential to the invention, it provides number of advantages which will be clear to the skilled in art, namely regarding the constant availability of oxygen-enriched gas to a user 123 via a delivering conduit 122 regardless of the oxygen generation phase of the oxygen separator device 101. Said delivering conduit 122 may comprise a filter (not shown), one or more sensors (not shown), one or more further valves (not shown). A valve 120 (product valve) is coupled to the conduit 119, between the oxygen separator device 101 and the reservoir 121. Such valve 120 is therefore not needed when an embodiment according to the present invention would not comprise a reservoir 121 (embodiment not shown).

Figure 7:
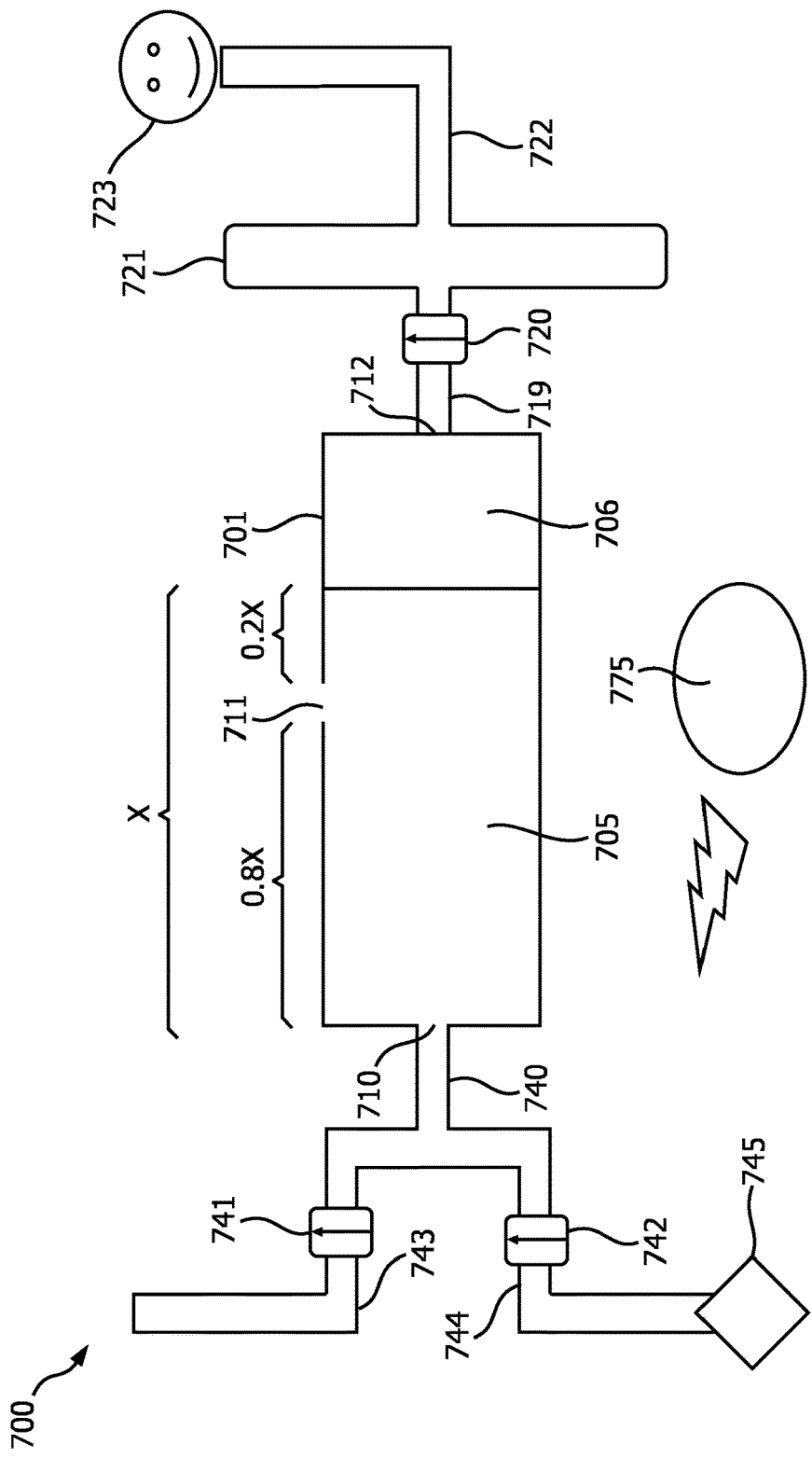
FIG. 7 is a schematic representation of a further embodiment of an oxygen separator according to the present invention.

The totality or a portion of the internal volume of the oxygen separator device comprises sorbent material 105. Although the sorbent material 105 depicted in FIG. 1 fills the whole volume of the oxygen separator 101, said sorbent material can alternatively fill a portion (or a fraction) of the total internal volume of the oxygen separator 101 (as depicted in FIG. 7 for instance). Said sorbent material 105 is configured to sorb (adsorb or absorb) one or more component of ambient air, where in a preferred embodiment, it is configured to adsorb or absorb nitrogen. Additionally or alternatively, the sorbent material 105 can be configured to adsorb or absorb water vapor, argon, pollutant and/or other components that can be found in breathing air. Non-limiting example of suitable sorbent materials for use in the present invention are Li-LSX zeolite, Na—X zeolite, Carbon Molecular Sieve (CMS), or Metal-Organic Frameworks (MOFs).

"Li-LSX" and "Na—X" are zeolites (i.e. alumino-silicates) representative of the so-called "faujasite (FAU)" structure type. Within the above chemical formulae, "X" represents the number of aluminum (Al) atoms per unit cell, where preferably $4<X\leq96$. In the foregoing example, "Na—X" is thus a zeolite having sodium (Na) as a metal with a number of Al atoms per unit cell (x) between 77 and 96. "Li-LSX" is a zeolite having with lithium (Li) as metal, where it is common practice to call "LSX" "Low Silica Zeolite X", where the number of Al atom per unit cell (x) is generally equal to 96 (said differently, where Si/Al ratio=1).

The oxygen separator device 101 further comprises at least two controllable interfaces 110, 112 respectively coupled to each conduit 119, 140. The controllable interface 110, on the feed phase of the oxygen separator device 101, is configured to allow a flow of pressurized oxygen comprising gas from conduit 140 into the volume of the oxygen separator device 101 during a feed phase, and to allow a flow of low pressure gas from the volume of the oxygen separator device 101 into the conduit 140 such that said low pressured gas is exhausted from the oxygen separator 100.

The controllable interface 112 is configured to allow a flow of (pressurized) oxygen-enriched comprising gas from the volume of the oxygen separator device 101 into the conduit 119 during a purging phase. As it will be elucidated hereunder, in an embodiment of the invention, said controllable interface 112 may also allow a flow of gas into the oxygen separator device 112, for instance a flow of oxygen-enriched gas from the reservoir 121 via the conduit 119.

The oxygen separator device 101 comprises a further controllable interface 111 for enabling a flow of non-oxygen-enriched gas, for instance from the surrounding of the oxygen separator device 101, into the volume of the oxygen separator device 101. Alternatively, said further controllable interface 111 can enable a flow of non-oxygen-enriched gas from the volume of the oxygen separator device 101 to flow into the surrounding of the oxygen separator device 101. Both embodiments will be further elucidated hereunder, for instance with reference to FIG. 2 and FIG. 7.

The oxygen separator 100 further comprises a processor 175 (or a controller, or a control unit, or processing unit, or a control module) which is in electrical communication with different components of the oxygen separator 100. In some embodiment, the processor 175 may be in electrical communication with one or more of the following elements of the oxygen separator 100, such as gas compressor 145, controllable interfaces 110, 111, 112, different valves 142, 141 and 120, sensors (not shown) and any other elements of the oxygen separator 100 such that, at least, four (4) PSA oxygen generation phases may be alternately carried for generating an oxygen-enriched gas from an oxygen comprising gas.

In order to provide the functionality attributed to processor 175 herein, to processor 175 may execute one or more modules. The one or more modules may be implemented in software; hardware; firmware; some combination of software, hardware, and/or firmware; and/or otherwise implemented. Although to processor 175 is shown in FIG. 1 as a single entity, this is for illustrative purposes only. In some implementations, to processor 175 may include a plurality of processing units, or modules. These processing units may be physically located within the same device (e.g., oxygen separator 100), or to processor 175 may represent processing functionality of a plurality of devices operating in coordination. For instance, the electrical communication may be done by means of wires, or wirelessly (e.g. Wi-Fi, Bluetooth, NFC or any other means for wirelessly transmitting information between two sources, such a receiving source and an emitting source).

Figure 2:
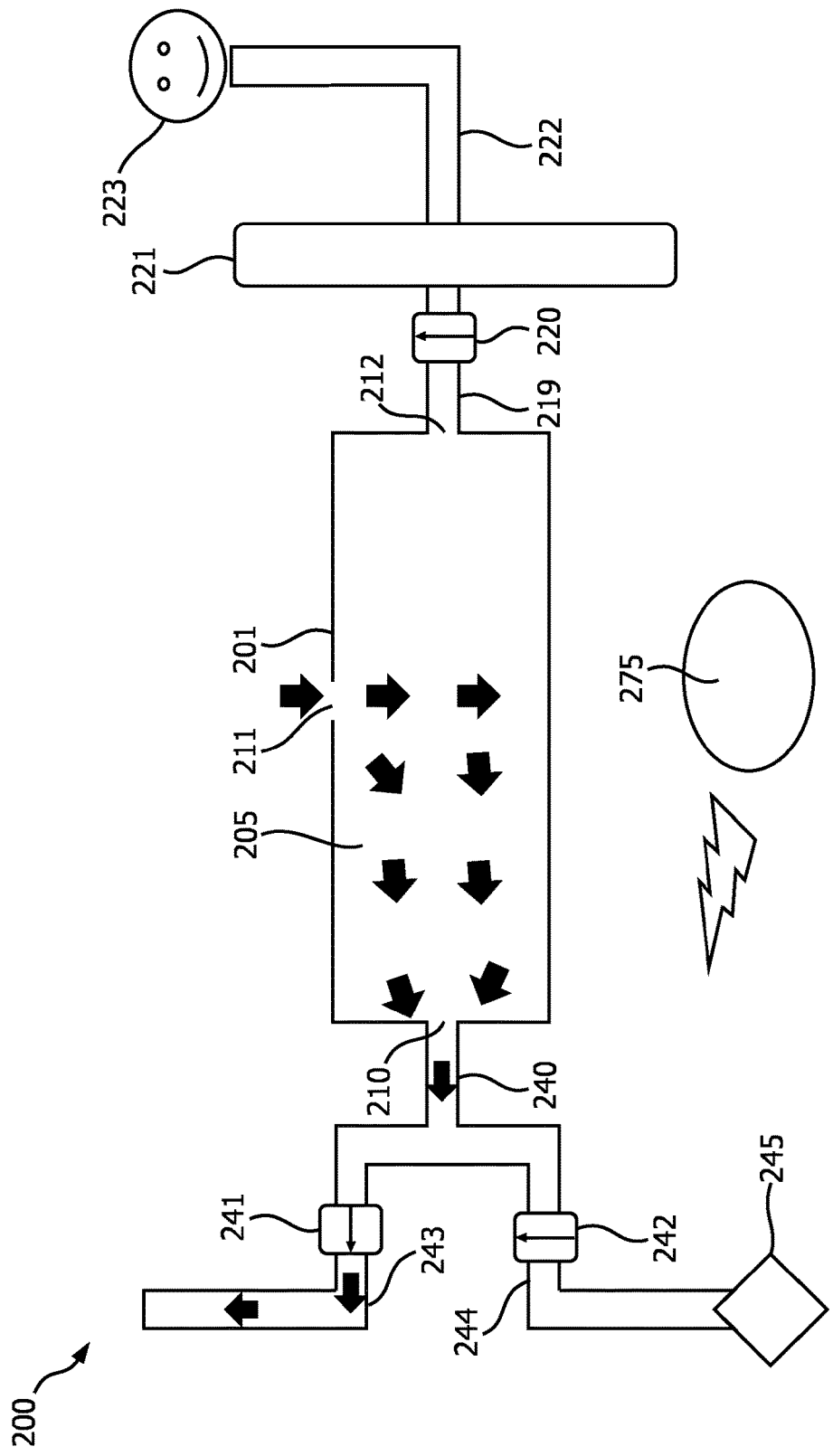
FIG. 2 is a schematic representation of a further embodiment of an oxygen separator according to the present invention during a purging phase.

FIG. 2 is a schematic representation of a further embodiment of an oxygen separator according to the present invention depicted during a purging phase (or cleaning phase). As mentioned above, the purging phase is aimed to "regenerate" the sieve material 205 following a producing phase in which the oxygen-enriched gas is generated from a compressed oxygen comprising gas. As previously mentioned, during such producing phase, the sieve material 205 sorbs (adsorbs or absorbs) at least one component of the compressed oxygen comprising gas, therefore said sieve material 205 reaches saturation or near saturation towards the end of said producing phase, where preferably said producing phase is stopped (or terminated, or comes to an end) prior to breakthrough of the sorbent material 205.

Within said phase, the gas compressor 245 is in an off mode, or an idle mode such that the oxygen comprising gas (for instance ambient air) guided to the valve 242 via the conduit 244 is uncompressed (i.e. being at a lower pressure than when gas compressor 245 is in an on mode). Valve 242 is closed, thereby blocking the oxygen comprising gas to reach the oxygen separator device 201. Valve 220 is also closed, thereby blocking the oxygen-enriched comprising gas in the reservoir 221 to reach the oxygen separator device 201. In an embodiment, said oxygen-enriched comprising gas may be guided from the reservoir 221 via conduits 222 to the user 223, or alternatively may be kept in said reservoir 221 so as to be provided to the user 223 at a further moment in time.

During operation of the oxygen separator device 200, the sorbent material 205 sorbs less component(s) of the compressed oxygen comprising gas towards the product end of the oxygen separator device 201 (where controllable interface 212 is located), or towards the product side of said sorbent material 205. This is to ensure purity of the oxygen-enriched gas. As mentioned above, a section of the sorbent material 205 should not receive an important amount of non-oxygen-enriched gas via the second interface, as some component(s) therein may be sorbed by a part of the sorbent material 205, thereby contaminating the oxygen-enriched comprising gas to effectively be delivered to the user 223 during the following producing phase. So as to limit the above, it is preferred (but not essential) to have a flow of oxygen-enriched gas flowing into the oxygen separator device 201 during the purging phase, concurrently with the flow of non-oxygen-enriched gas.

Within this embodiment, a volume of non-oxygen-enriched gas (a non-product gas, or a purging gas, or a cleaning gas) is guided from the surrounding environment of the oxygen separator device 201 (and/or the surrounding environment of the oxygen separator 200) into the oxygen separator device 201 via controllable interface 211 (e.g. second controllable interface 211). The flow of uncompressed non-oxygen-enriched gas is a slight overpressure relative to the interior of the oxygen separator device 201 (at ambient pressure, slightly above ambient pressure, slightly above internal pressure of the oxygen separator device), thereby causing the sorbent material 205 to be desorbed from the sorbed component(s). For instance, the slight overpressure could be a pressure in the range of 0.001 to 0.01 bar (i.e. 10 to 100 mmH2O), preferably 0.002 bar (i.e. 20 mmH2O). The component(s) of the oxygen comprising gas that has (have) been sorbed by the sorbent material 205 in the producing phase is (are) therefore released within the volume of the oxygen separator device 201, and guided from the inside of the oxygen separator device 201 toward the outside of the oxygen separator device 201 via controllable interface 210 (e.g. first controllable interface 210), the flow of gas comprising the desorbed component(s) of the oxygen comprising gas is guided outside the oxygen separator 200 by one or more conduits 240, 243. During this phase, valve 241 is open such that the gas exiting the oxygen separator device via the second controllable interface 210 is exhausted form the oxygen separator 200. The arrows shown in FIG. 2 represents the flow of gas during a purging phase according to this embodiment of the invention.

Within the embodiment depicted in FIG. 2, the processor 275 is configured to control certain elements of the oxygen separator 200, for instance one or more valves, such as to enable the fluidic connection allowing a flow of gas between the inside and the outside of the oxygen separator device 201. Such flow of gas between the inside and the outside of the oxygen separator device 201 flows via the first controllable interface 210 and (directly or indirectly) the second controllable interface 211. Processor 275 is configured to control at least the valves 241, 242 and 220 as mentioned herein, as well as the first controllable interface 210 and the second controllable interface 211 such that the flow of non-oxygen-enriched gas flows (cleaning flow) into the oxygen separator device 201 causing the sorbent material 205 to be regenerated. As a consequence of the foregoing, said mixture of non-oxygen enriched gas with the one or more components desorbed from the sorbent material 205, is exhausted from the oxygen separator device 201 via the second controllable interface 210. Within this embodiment, controllable interface 211 acts as an inlet, while controllable interface 210 acts as an outlet, at least during the purging phase.

The skilled in the art will understand that the controllable interface 211 according to this embodiment may be located at different position relative to the controllable interface 210. For instance, but without limitation, said controllable interface 211 may be collocated with the controllable interface 212 (e.g. third controllable interface); in such embodiment, a connecting mechanism (e.g. rotating valve, connection and reconnection means of a further conduit (not shown)) would enable the flow of non-oxygen-enriched comprising gas into the oxygen separator device 201, while the oxygen enriched gas is retained in the reservoir 221 such that its access to the oxygen separator device 201 is blocked, or obstructed, or limited. Alternatively, the skilled person would see number of mechanisms suitable to be used according to the present invention, while having controllable interface 211 collocated with the depicted controllable interface 212, in which a volume of non-oxygen-enriched gas would be enabled to flow from the outside of the oxygen separator device 201 into the inside of said oxygen separator device 201, and where no volume of oxygen-enriched comprising gas would be enabled to flow from the reservoir 221 to the inside of said oxygen separator device 201.

Figure 4:
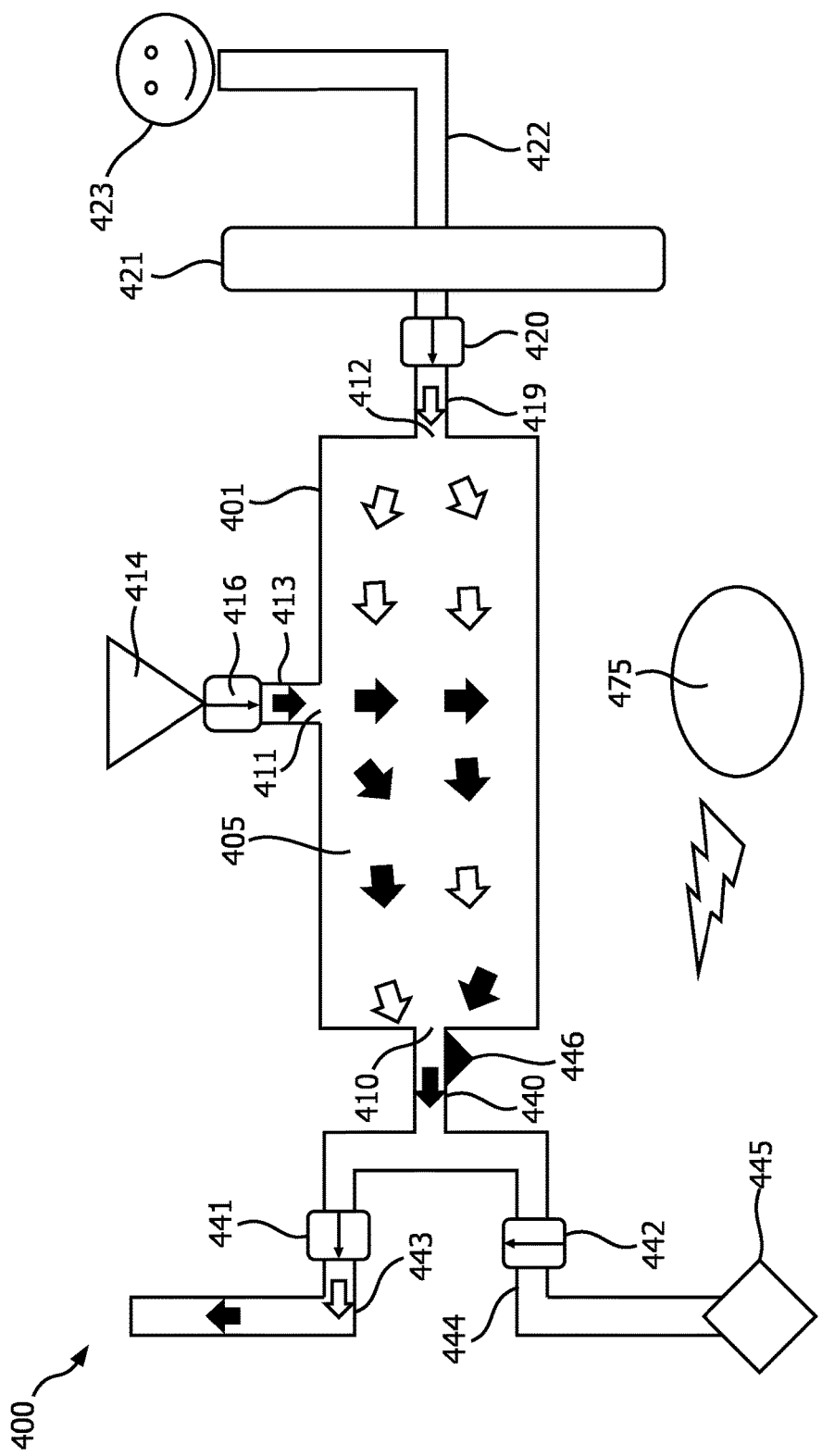
FIG. 4 is a schematic representation of a further embodiment of an oxygen separator according to the present invention during a purging phase.

In an embodiment of the present invention, the flow of non-oxygen-enriched gas into the oxygen separator device 201 via the controllable interface 211 is generated passively (as depicted in FIG. 2) or alternatively, is generated actively (as depicted in FIG. 4). Within the context of the present invention, a flow of gas is generated passively when no additional energy is, nor any additional mass is injected for generating said flow. In this context, the movement of the volume of gas is generated as a result of a pressure difference between two volumes (e.g. between the outside and the inside of the oxygen separator device 201). It is well known that a fluid (liquid, plasma or gas) will flow from a volume with the highest pressure (e.g. in bar) towards the volume with the lowest pressure.

Amongst the advantages of the present embodiment, as mentioned earlier, the total energy consumption of the oxygen separator 200 according to the present invention is diminished relative to known oxygen separators. For instance, the gas compressor 245 is in a rest mode (in an off mode, or an idle mode) during the purging phase, thereby saving energy that can be translated in, for instance, at least one of a diminution of size of the energy source (not shown) such a battery pack, an increased autonomy of the oxygen separator 200 (in time), an increased yield of oxygen-enriched gas available for the user 223 for a same consumption of energy, or any other advantages that are herein mentioned and/or will be clear to the skilled in the art.

Figure 3:
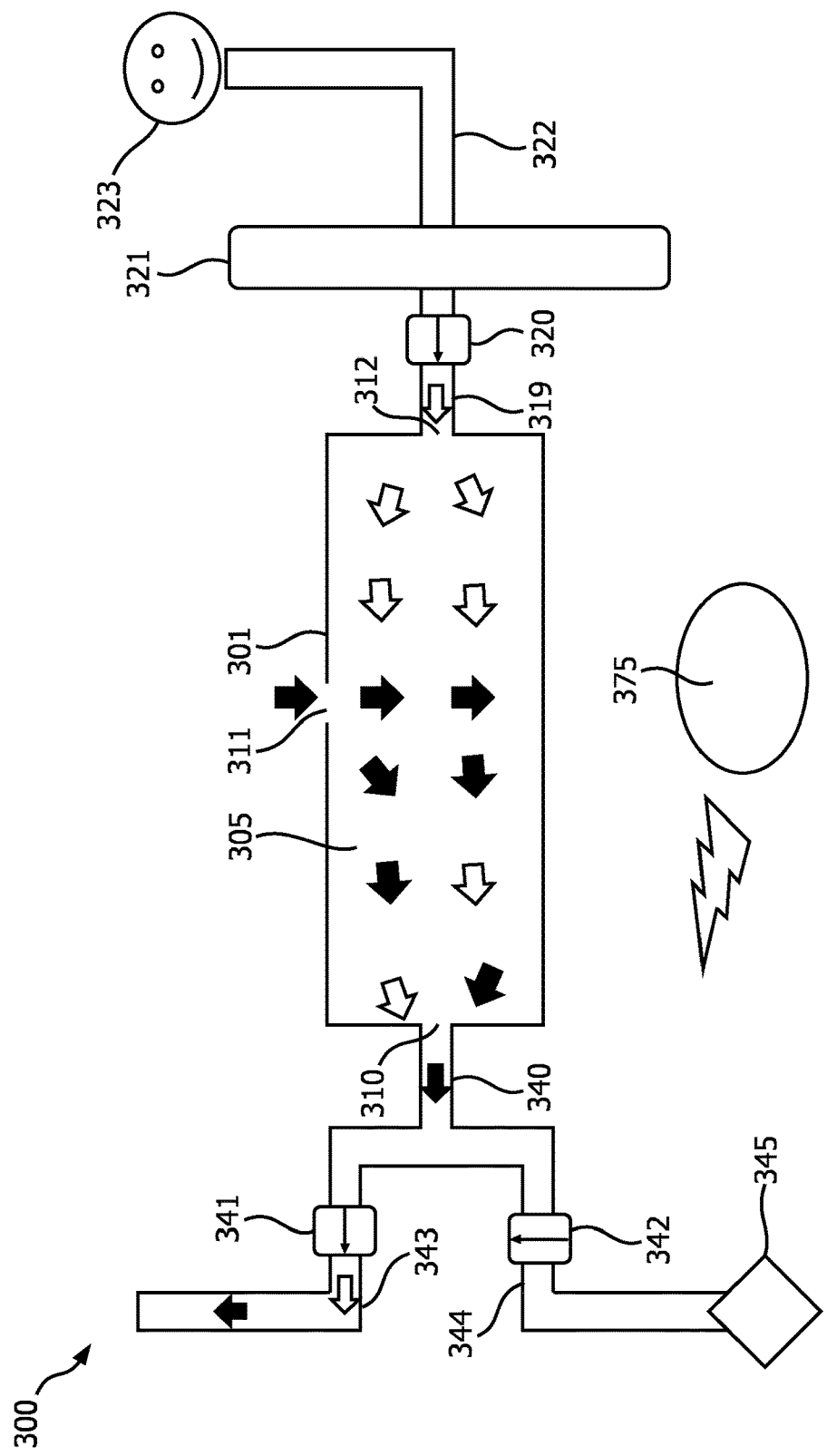
FIG. 3 is a schematic representation of a further embodiment of an oxygen separator according to the present invention during a purging phase.

FIG. 3 is a schematic representation of a further embodiment of an oxygen separator according to the present invention depicted during a purging phase (or cleaning phase). In comparison to the embodiment depicted in FIG. 2, in the embodiment depicted in FIG. 3, the flow of non-oxygen-enriched comprising gas is combined (or mixed) with a flow of oxygen-enriched comprising gas within the oxygen separation device during the purging phase. The arrows shown in FIG. 3 represents the flow of gas during a purging phase according to this embodiment of the invention.

Within this embodiment, the processor 375 is configured to control valve 320 such that during the purging phase, a flow of oxygen-enriched gas is enabled from the reservoir 321 into the oxygen separator device 301 via the controllable interface 312, guided by the conduit 319. Such flow of oxygen-enriched gas, in addition to the flow of non-oxygen enriched gas flowing into the oxygen separator device 301 via the controllable interface 311, cause the sorbent material 305 to be purged (or desorbed, or cleaned). The sorbed component(s) of the compressed oxygen comprising gas (sorbed by the sorbent material 305 during a producing phase) are desorbed from the sorbent material 305 and mixed with the volume made of the mixture of oxygen-enriched gas and the volume non-oxygen-enriched gas that entered into the oxygen separator device 301 via respectively controllable interface 312 and 311 controllable interface. Such mixture, with the addition of the desorbed component(s) flow outside the oxygen separator 301 via controllable interface 310 before being exhausted form oxygen separator 300. The gas mixture within the volume of the oxygen separator device 301 following the purging phase, where the component(s) are desorbed from the sorbent material 305, is outputted from the oxygen separator device 301 via the controllable interface 310. As valve 341 is in an open position, the flow gas is guided outside the oxygen separator 300 by conduits 340 and 343.

In this embodiment, although the status of valve 320 may differ depending of the configuration of the oxygen separator 300, the volume of oxygen-enriched gas is enabled to enter, during the purging phase, the oxygen separator device 301 via the controllable interface 312; hence from the same controllable interface 312 that outputted oxygen-enriched gas generated from the oxygen comprising gas within the producing phase.

Additionally or alternatively, the oxygen separator 300 may comprise more than one oxygen separator devices 301, said oxygen separator devices are in a fluidic communication via their respective product ends (i.e. the side where oxygen-enriched gas is outputted from the oxygen separator device during a producing phase). Within this embodiment, the flow of oxygen-enriched gas may be inputted into the oxygen separator device 301 via the fluidic communication between the respective ends of each oxygen separator devices; additionally or alternatively may be inputted into the oxygen separator device 301 via the flow from reservoir 321.

It will be understand that within the embodiment depicted in FIG. 3, the oxygen separator device comprises at least three controllable interfaces 310, 311, 312 which can be regulated (alternatively controlled) via the processor 375 such as to enable a movement of volume of gas (a flow) from the outside of the oxygen separator device 301 to the inside of said oxygen separator device 301, and from the inside of the oxygen separator device 301 to the outside of said oxygen separator device 301. As the oxygen separator device 301 is a hollow receptacle comprising namely the sorbent material 305, the outside of said oxygen separator device 301 shall be constructed as comprising the surrounding environment thereof, but also the conduits 340, 319, all other components (such as the reservoir 321, the valves 342, 341, 320) which are generally located within the outer boundaries of the oxygen separator device 301.

Within this embodiment, it is demonstrated that according to the invention, all controllable interfaces 310, 311, 312 of the oxygen separator device 301 may act as an inlet and/or as an outlet depending of the phase of the oxygen generation cycle carried by the oxygen separator device 301, as controlled by the processor 375.

Within the scope of the invention, the three controllable interfaces 310, 311, 312 can be indistinctively named a first controllable interface, a second controllable interface and a third controllable interface, which could, at least for some of them, be collocated (as elucidated herein).

As within this embodiment the purging flow (or cleaning flow) consists partially of a non-oxygen-enriched gas and an oxygen-enriched gas, the yield of oxygen-enriched gas that can be delivered to the patient 323 is significantly increased in comparison to known oxygen separators which use solely oxygen-enriched gas as a cleaning flow, thus for purging the sorbent material of the oxygen separator device 301.

FIG. 4 is a schematic representation of a further embodiment of an oxygen separator according to the present invention depicted during a purging phase (or cleaning phase). This embodiment depicts an active way to generate the flow of non-oxygen-enriched gas via a fan (a ventilator, an air blower, an aerator) 414. Alternatively, this embodiment may comprise a vacuum pump 446 coupled to the controllable interface 401 for generating the movement of non-oxygen-enriched gas from the outside of the oxygen separator device 401 to the inside of the same. The arrows shown in FIG. 4 represents the flow of gas during a purging phase according to this embodiment of the invention.

Although means 414, 446 to actively generate a flow of gas between two volumes requires an input of energy, the means proposed within this embodiment of the invention needs significantly less energy than a gas compressor, hence the energy saving advantages remain. Moreover, the additional weight generated by said means 414, 446 is negligible relative to gas compressor 445, hence does not limit or otherwise hampers the portability of an oxygen separator which would make use of the present invention.

The air blower, air pump or fan 414 shall be construed as any type of device suitable for supplying air into the oxygen separator device 401 and provide a small increase in air pressure (overpressure) in the separation device 401. The terms air blower, air pump and fan are used interchangeably herein and a reference to one includes the others, and vice versa, unless otherwise expressly provided. Preferably the fan 414 is able to provide a small overpressure in the region of, for example 0.01-0.15 bar (approximately 100-1500 mmH2O). Preferably the maximum air flow of the fan 414 in operation is between approximately 12 standard liters per minute (slpm). In some embodiments, it is sufficient for the air blower, air pump or fan 414 to provide an increase in pressure in the oxygen separator device 401 of the order of up to 10%, or up to 20% in the pressure (an air pressure rise of up to 1136 mmH2O or up to 2066 mmH2O respectively), although air blowers, air pumps or fans 414 that provide higher pressure rises are also contemplated. It will be appreciated therefore that the fan 414 is preferably a small, low-power component. It will also be appreciated that the air blower 414 is much smaller and less powerful than a gas compressor.

In a first embodiment, the oxygen separator comprises a fan 414 in fluidic cooperation with controllable interface 411. In a preferred embodiment, a conduit 413 is coupled to the fan 414 such as to guide the flow of non-oxygen-enriched gas from the outside of the oxygen separator device 401 into said oxygen separator device 401. Although preferential, said conduit 413 is not essential, as the fan 414 can be attached, coupled or otherwise joined to any other component(s) of the oxygen separator 400 such that in use, it is configured to generated a volume of non-oxygen-enriched-gas reaching controllable interface 411. During the purging phase, the controllable interface 411 enables said volume of non-oxygen-enriched-gas to enter the oxygen separator device 401, the overpressured volume of non-oxygen-enriched-gas flows from the outside of the oxygen separator device 401 towards the inside of said oxygen separator device 401.

Additionally, the embodiment depicted in FIG. 4 may comprise a valve 416 controllable by the processor 475. Said valve 416 is configured to allow the overpressured flow of non-oxygen-enriched gas towards the controllable interface 411 via the conduit 413. Said valve 416 may be, in an exemplary embodiment, a means for the processor to control the controllable interface 411. It should be noted that the invention does not require such valve 416 as other arrangements for controlling the controllable interface 411 will be foreseen by the skilled in the art.

In use, once the slightly overpressure flow of non-oxygen-enriched-gas generated by fan 414 flows into the oxygen separator device 401 via controllable interface 411 according to the present embodiment, such volume of non-oxygen-enriched gas may be mixed with a volume of oxygen-enriched gas flowing via the controllable interface 412 (already at a slightly higher pressure, for instance as a result of the storage in the reservoir 421) therefore causing the sorbent material 405 to be purged, regenerated. Alternatively, as described above, the purging of the sorbent material 405 is caused only by the overpressure flow of non-oxygen-enriched-gas flowing via controllable interface 411.

Alternatively, in another embodiment, a vacuum pump 446 coupled to the controllable interface 401 such that a flow of non-oxygen-enriched gas in enabled to flow from the outside of the oxygen separator device 401 into the oxygen separator device 401 via the controllable interface 411. Within this alternative embodiment, the vacuum pump 446 generates, when in used, an under pressure within the oxygen separator device 401, said underpressure causing, when controllable interface 411 is in fluidic communication with the exterior of the oxygen separator device 401, a volume of non-oxygen-enriched gas to flow from the outside of the oxygen separator device 401 within said oxygen separator device 401 as a result of fluid dynamic. Said flow of non-oxygen-enriched gas causes the sorbent material 405 to be purged, based on the same principles as elucidated herein. Alternatively, as described above, the purging of the sorbent material 405 may results of by the flow of non-oxygen-enriched-gas mixed with the flow of volume of oxygen-enriched gas flowing into the oxygen separator device 401 via respectfully controllable interface 411 and controllable interface 412.

Figure 5:
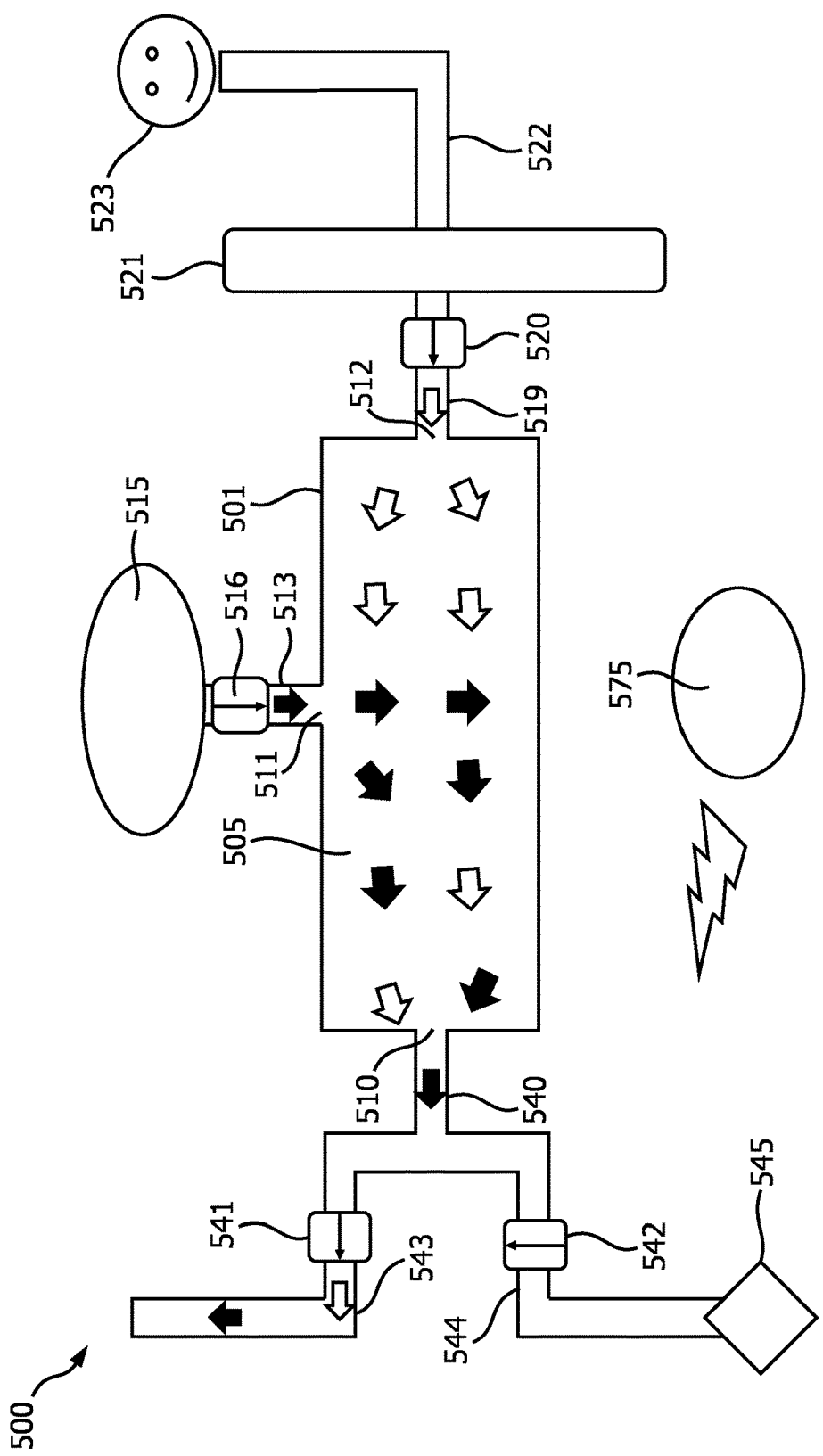
FIG. 5 is a schematic representation of a further embodiment of an oxygen separator according to the present invention during a purging phase.

FIG. 5 is a schematic representation of a further embodiment of an oxygen separator according to the present invention depicted during a purging phase (or cleaning phase). This embodiment comprises a reservoir 515 (or a non-oxygen-enriched gas reservoir), for instance a tank, a container, a receptacle, in fluidic cooperation with the controllable interface 511. Said non-oxygen-enriched gas reservoir 515 may comprise ambient air, overpressured ambient air, or any other gas (or overpressured gas) suitable to regenerate or sorb the sorbent material 505 when flowing into the oxygen separator device 501. The arrows shown in FIG. 5 represents the flow of gas during a purging phase according to this embodiment of the invention.

The non-oxygen-enriched gas reservoir 515 may be in fluidic communication with the compressor 545 such that the volume non-oxygen-enriched-gas within the non-oxygen-enriched gas reservoir 515 is pressurizable by the gas compressor 545. In order to keep the energy efficiency of the present invention, it is preferable that such pressurization occurs during a producing phase (i.e. while said gas compressor is compressing the oxygen comprising gas for delivery into the oxygen separator device 501 via the controllable interface 510 such that an oxygen-enriched gas is generated and outputted via the controllable interface 519). The skilled in the art will understand that during said producing phase, the controllable interface 511 will be closed so as to disable any entry of non-oxygen-enriched-gas into the oxygen separator device 501.

Additionally, the embodiment depicted in FIG. 5 may comprise a valve 516 controllable by the processor 545 and configured to allow a flow of gas from the non-oxygen-enriched-gas reservoir 515 towards the controllable interface 511 via the conduit 513.

Additionally or alternatively, a fan (not shown in FIG. 5) of the kind disclosed by reference to FIG. 4 could be added to the embodiment depicted in FIG. 5, such as to ensure a flow of non-oxygen-enriched-gas from the reservoir 515 into the oxygen separator device 501 via the controllable interface 511 and guided by the conduit 513.

Figure 6:
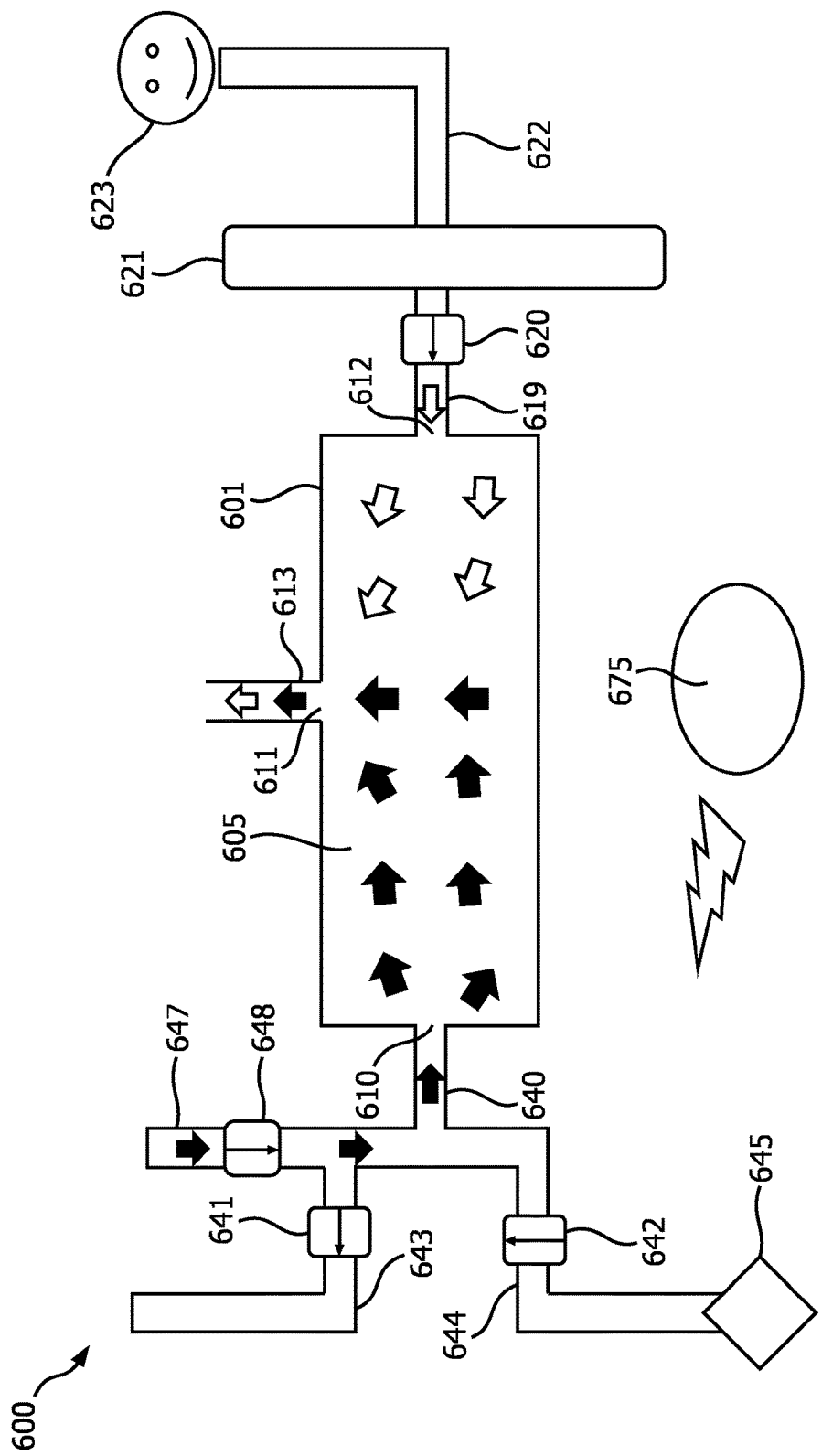
FIG. 6 is a schematic representation of a further embodiment of an oxygen separator according to the present invention during a purging phase.

FIG. 6 is a schematic representation of a further embodiment of an oxygen separator according to the present invention during a purging phase. In this alternative embodiment according to the present invention, the oxygen separator 600 is configured such that the volume of non-oxygen-enriched gas may flow into the oxygen separator device 601 via the controllable interface 610, while the gas resulting of the desorbing (or cleaning) of the sorbent material 605 is outputted from the oxygen separator device 601 via the controllable interface 611 such as to be exhausted into the surrounding environment of the oxygen separator 600. The arrows shown in FIG. 6 represents the flow of gas during a purging phase according to this embodiment of the invention.

In an exemplary embodiment, a non-oxygen-enriched conduit 647 in fluidic communication with conduit 640 is configured to guide a flow of non-oxygen-enriched gas towards the controllable interface 610. During the purging phase, a flow controller (such as a valve) 648 enables the flow of non-oxygen-enriched gas into the oxygen separator device 601 via controllable interface 610. The volume of non-oxygen-enriched gas enables desorption of the sorbent material 605 such that a gas comprising a mixture of non-oxygen-enriched gas and gas component(s) sorbed by the sorbent material 605 during a production phase is outputted via the controllable interface 613 and guided into the oxygen separator 600 surrounding environment via conduit 613.

Within this embodiment, during a purging phase, valve 620 enables a volume of oxygen-enriched gas contained in reservoir 621 to flow into the oxygen separator device 601 via controllable interface 612. The flow of non-oxygen-enriched gas entering the oxygen separator device 601 and the flow of oxygen-enriched gas entering the oxygen separator device 601 will meet (where the two volumes of gas will enter in to contact) into said oxygen separator device 601 such that the volume consisting of a gas mixture of non-oxygen-enriched gas, oxygen-enriched gas and desorbed component(s) of the oxygen comprising gas will be outputted via controllable interface 611 so as to be exhausted surrounding environment of the oxygen separator 600 similarly as described above.

Additionally, or alternatively, the conduit 647 may be coupled to a fan (or a ventilator, or a blower, or an aerator) (not shown) such as to generates an overpressure volume of non-oxygen-enriched gas. Alternatively, conduit 613 may be coupled with a vacuum pump (not shown) such as to generate a flow of the gas mixture to be outputted by the controllable interface 611.

FIG. 7 is a schematic representation of a further embodiment of an oxygen separator according to the present invention, where the optimal location of the controllable interface 711 is depicted. It is to be understood that said controllable interface 711 is configured to enable a volume of non-oxygen-enriched gas into the oxygen separator device 701, or is configured to enable a volume of gas out of the oxygen separator device 701 based on one of the embodiment according to the present invention.

As the purging phase aims to clean (desorb, restore) the sorbent material 705, as indicated herein, the optimal location of said controllable interface 711 is irrespective of the length, size or otherwise dimension of the oxygen separator device 701, but is preferably relative to space filled by the sorbent material 705 contained into said oxygen separator device.

As mentioned earlier, and depicted in FIG. 7, the sorbent material 705 may comprise only a fraction of the inner volume of the oxygen separator device 701, or alternatively it can fill the totality of said inner volume (as represented in FIGS. 1-6). The area 706 represents a volume of the oxygen separator device 706 which is not comprising sorbent material, but can comprise oxygen-enriched gas or other material such as a filter.

In its optimal location, the controllable interface 711 will be located on the surface of the oxygen separator device, between controllable interface 710 and controllable interface 712, preferably at approximately eighty percent (80%) of the linear representation of the distance between a first side (or extremity) of the sorbent material 705 receiving a flow of compressed oxygen comprising gas during a production phase, and a second side (or extremity) of the sorbent material 705 where a flow of oxygen-enriched gas is outputted during said production phase. Alternatively, the controllable interface may be positioned at any points on said linear representation of said distance between two sides of the sorbent material 705, such as seventy-height percent (78%), seventy-five (75%), seventy percent (70%), sixty percent (60%), fifty percent (50%), forty-five percent (45%) of said linear representation between said first side and said second side of the sorbent material 705. Alternatively, as mentioned hereinabove, the controllable interface 711 may be collocated with the controllable interface 712.

Figure 8:
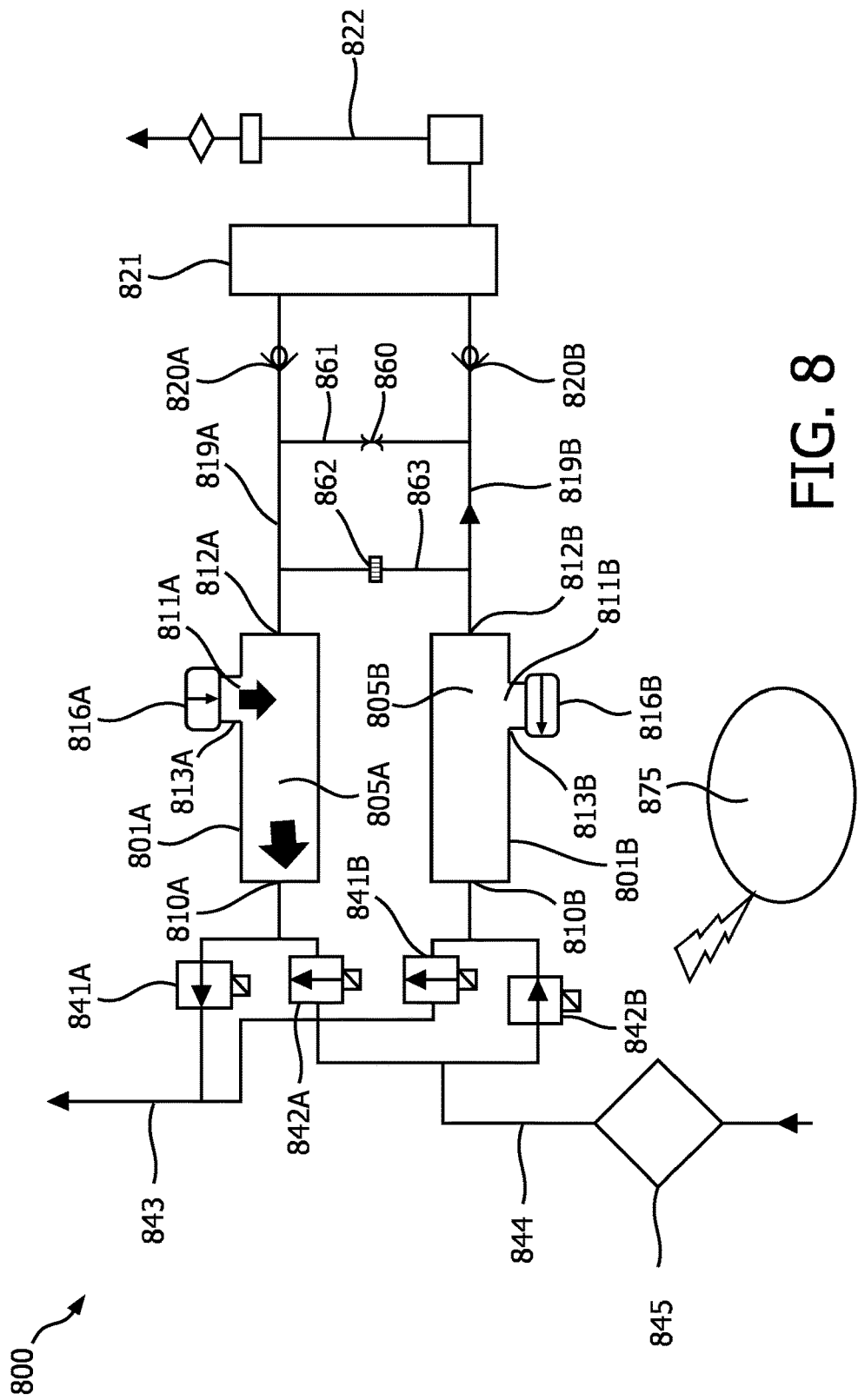
FIG. 8 is a schematic representation of a further embodiment of an oxygen separator according to the present invention, said oxygen separator comprising two oxygen separator devices.

FIG. 8 is a schematic representation of a further embodiment of an oxygen separator according to the present invention, said oxygen separator comprising two oxygen separator devices 801A, 801B. FIG. 8 depicts a representation of the system while an oxygen separator device 801B is in a producing mode (or producing phase) while the other oxygen separator device 801A is in a purging mode (or purging phase). It is to be understood that as the two oxygen separator devices 801A and 801B are working in a cyclic mode of operation, the description below of oxygen separator device 801A applies also to oxygen separator device 801B when said device is into a purging mode and vice versa; thus within one of the phases of the oxygen generation cycle.

The oxygen separator 800 may comprise any of the embodiment according to the present invention. Within an exemplary PSA process, the oxygen separator 800 comprises two oxygen separator devices 801A, 801B therein the phases (e.g. the four phases of the oxygen generation cycle as explained above) are successively carried on alternating oxygen separator devices. As mentioned earlier, although depicted in a producing mode, the oxygen separator device 801B will be in a purging mode at another moment of the oxygen generation cycle; this changing of mode is dictated by the processor 875 whereby valves are changed such that gas flow use different routes as guided by different conduits.

Into a producing mode, oxygen separator device 801B receives an oxygen comprising gas compressed by processor 845, and guided towards said oxygen separator device 801B by valve 842B in an opened position, while valve 841B is in a closed position. The flow of compressed oxygen comprising gas enters the oxygen separator device 801B via controllable interface 810B. As it progresses into the oxygen separator device 801B, the volume of compresses oxygen comprising gas interacts with the sorbent material 805B such at least one component of said gas is sorbed by the sorbent material 805B, for instance nitrogen. Consequently, a volume of oxygen-enriched gas is outputted from the oxygen separator device 801B via the controllable interface 811B. In this phase, controllable interface 811B is closed such that any volume of non-oxygen-enriched gas is blocked from entering the oxygen separator device 801B via said orifice 811B.

As depicted in FIG. 8, a part of the volume of oxygen-enriched gas will be guided towards the reservoir 821 while a part of said volume of oxygen-enriched gas (the purging volume), in a significantly lesser amount, will be guided towards the other oxygen separator device 801A which is undergoing the purging phase of the oxygen generation cycle. The purging volume of oxygen-enriched gas (or cleaning volume) is guided through conduit 861 comprising an orifice 860 to modify the pressure flow of said purging volume of oxygen-enriched gas. As valve 820A is in a close position (or nearly closed position), said purging volume of oxygen-enriched gas is blocked from entering the reservoir 823, thereby entering the oxygen separator device 801A via the controllable orifice 812A thereby corresponding to the flow of oxygen-enriched gas entering the oxygen separator 801A for the purging phase of the same, enabling regeneration of the sorbent material 805A, as explained above. It will therefore be clear to the skilled in the art that any embodiment according to the present invention, for instance, but without limitation the ones depicted within FIGS. 1 to 7, and explained herein, can be used within an oxygen concentrator 800 comprising two oxygen separator devices 801A, 802B.

Alternatively, in another embodiment, conduit 861 is removed, where the volume of oxygen enriched is guided into the oxygen separator device 801A from the reservoir 821.

The oxygen separator 801A and 801B may also be fluidically connected via conduit 863, such conduit comprising a balancing valve 862. Said balancing valve 862, as controlled by the processor 875, enables a flow of oxygen-enriched gas between the respective second ends of the oxygen separator 801A and 801B during an equalization sub-phases of the oxygen generation cycle, for instance following each producing and purging cycle. During such equalization phase, the interior pressure of both oxygen separator 801A and 801B equalizes (reaches an equilibrium). During a producing phase, likewise during a purging phase, the balancing valve 862 is in a close position such that no volume of gas flows within conduit 863.

As mentioned earlier, oxygen separator 801A being in a purging phase, it may embed any of the embodiment described hereinabove. For instance, the volume of oxygen-enriched gas flowing into the oxygen separator device 801A via controllable interface 812A encounters an overpressured volume of non-oxygen enriched gas that flows into the oxygen separator device 801A via controllable orifice 811A. Such flow of both volumes will cause the sorbent material 805A to be purged (desorb, clean, regenerate), generating a gas mixture that will be outputted from the oxygen separator device 801A via controllable interface 810A, and thereafter from the oxygen separator 800. Accordingly, the skilled person will understand that said oxygen separator device 801A may be configured according to any embodiment of the present invention, having its controllable orifice 811A enabling a volume of non-oxygen enriched gas between the inside and the outside of oxygen separator device 801A.

Figure 9:
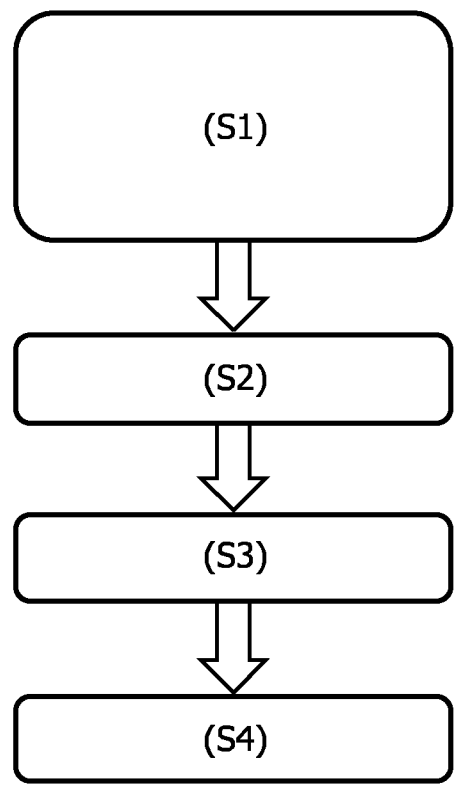
FIG. 9 is a block diagram representation of a method for controlling an oxygen separator device according to the present invention.

FIG. 9 is a block diagram representation of a method for controlling an oxygen separator device according to the present invention.

Step (S1) consists of providing at least one oxygen separator device comprising: i) a sorbent material for sorbing at least one component of the oxygen comprising gas; and ii) at least two controllable interfaces, comprising a first controllable interface and a second controllable interface, for controlling the communication of gas between the inside and the outside of the oxygen separator device. The oxygen separator device to be provided may consist of any of the embodiments and/or alternative to the ones illustrated in the present document.

Step (S2) consists of controlling the oxygen separator such that a plurality of phases are sequentially carried, amongst them a purging phase. Said phase is generally carried by a processor based on instruction in the form of program code.

Step (S3) consists of controlling the at least two controllable interfaces such that a flow of gas is generated between a first controllable interface and a second controllable interface during at least the purging phase.

Step (S4) consists of locating and/or controlling the second controllable interface such that it controls the fluidic coupling between the inside of the oxygen separator device and a volume of non-oxygen-enriched gas during the purging phase.

In a preferred embodiment, the abovementioned method is such that it can be processed by the processor, such that all steps thereof may be carried by the processor without the need of user interaction.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An oxygen separator for generating an oxygen-enriched gas from an oxygen comprising gas, said oxygen separator comprising:
    (a) an oxygen separator device comprising:
        (1) an inlet end for receiving the flow of oxygen comprising gas;
        (2) an outlet end opposite the inlet end for outputting a flow of oxygen-enriched gas;
        (3) a sorbent material having a feeding end and a product end for sorbing at least one component other than oxygen of the oxygen comprising gas; and
        (4) at least three controllable interfaces, comprising a first, feed-side, controllable interface at the inlet end configured to control the communication of an oxygen-comprising gas between the inside and the outside of the oxygen separator device, a second controllable interface configured to control the communication of a non-oxygen-enriched gas between the inside and the outside of the oxygen separator device, and a third, product-side, controllable interface at the outlet end for controlling the communication of an oxygen-enriched gas between the inside and the outside of the oxygen separator device; and
    (b) a processor configured to control the oxygen separator such that a plurality of operational phases are sequentially carried out, amongst them a purging phase for purging the sorbent material thereby to release said sorbed at least one component of the oxygen-comprising gas, wherein the processor is configured to control the at least three controllable interfaces such that a flow of gas is generated between the first controllable interface and the second controllable interface during at least the purging phase, wherein the second controllable interface is located between the first controllable interface and the third controllable interface, at a distance from the feeding end of approximately eighty percent, 80%, or less of the distance separating the feeding end and the product end of the sorbent material and the second controllable interface is configured to control the fluidic coupling between the inside of the oxygen separator device and a volume of non-oxygen-enriched gas during the purging phase, such that the non-oxygen-enriched gas is used to purge the sorbent material.

2. The oxygen separator of claim 1, wherein the third controllable interface is configured to control the fluidic coupling between the inside of the oxygen separator device and the volume of oxygen-enriched gas during at least the purging phase, wherein the processor is further configured such that a further flow of gas between the third controllable interface and the first controllable interface or the second controllable interface is generated during the purging phase.

3. The oxygen separator of claim 1, wherein the second controllable interface is fluidically coupled to a reservoir for hosting the volume of non-oxygen-enriched gas.

4. The oxygen separator of claim 1, wherein one of the at least three controllable interfaces is coupled to a fan for generating the flow of non-oxygen-enriched gas.

5. The oxygen separator of claim 3, wherein one of the at least three controllable interfaces is coupled to a vacuum pump for generating the flow of non-oxygen-enriched gas.

6. The oxygen separator of claim 1, wherein the sorbent material is at least one taken from the list of: i) Li-LSX zeolite, ii) Na—X zeolite, iii) Carbon Molecular Sieve (CMS), and iv) Metal-Organic Frameworks (MOFs).

7. The oxygen separator of claim 1, wherein the processor is configured to control the first controllable interface, the second controllable interface and the third controllable interface such that:
    the flow of gas is directed from the second controllable interface (111) towards the first controllable interface; and
    the further flow of gas is directed from the third controllable interface towards the first controllable interface, wherein the first controllable interface is configured to output gas from the oxygen separator device.

8. The oxygen separator of claim 7, wherein the processor is configured to control the first controllable interface, the second controllable interface and the third controllable interface such that:
    the flow of gas is directed from the first controllable interface (110) towards the second controllable interface; and
    the further flow of gas is directed from the third controllable interface towards the second controllable interface, wherein the second controllable interface is configured to output gas from the oxygen separator device.

9. The oxygen separator of claim 1, wherein the first controllable interface, the second controllable interface and the third controllable interface respectively comprise a first valve, a second valve and a third valve, wherein the processor is further configured to regulate the valves during the purging phase so that the flow of gas and/or the further flow of gas is generated.

10. A method of controlling the oxygen separator of claim 1 to generate the oxygen-enriched gas from the oxygen comprising gas, the method comprising the steps of: controlling the oxygen separator such that the plurality of operational phases are sequentially carried out, amongst them the purging phase for purging the sorbent material thereby to release said sorbed at least one component of the oxygen-comprising gas; controlling the at least three controllable interfaces such that a flow of gas is generated between the first controllable interface and the second controllable interface during at least the purging phase; and controlling the second controllable interface such that it controls the fluidic coupling between the inside of the oxygen separator device and a volume of non-oxygen-enriched gas during the purging phase, such that the non-oxygen-enriched gas is used to purge the sorbent material.

11. The method of claim 10 further comprising the steps of:
    controlling the third controllable interface such it controls the fluidic coupling between the inside of the oxygen separator device and a volume of oxygen-enriched gas during at least the purging phase; and generating a further flow of gas between the third controllable interface and the second controllable interface or the first controllable interface during the purging phase.

12. The oxygen separator of claim 1, wherein the sorbent material extends from the inlet end of the oxygen separator device.

13. The oxygen separator of claim 1, wherein the second controllable interface is located at a distance from the feeding end of the sorbent material of between 45% and 80% of the distance separating the feeding end and the product end of the sorbent material.

14. The method of claim 10, wherein the non-oxygen-enriched gas is ambient air.

* * * * *